United States Patent [19]

Ono

[11] Patent Number: 5,207,288
[45] Date of Patent: May 4, 1993

[54] SCOOTER BODY AND FRONT-WHEEL DRIVE TYPE ELECTROMOTIVE SCOOTER

[75] Inventor: Masao Ono, Yokohama, Japan

[73] Assignee: Tokyo R&D Co., Ltd., Tokyo, Japan

[21] Appl. No.: 645,582

[22] Filed: Jan. 24, 1991

[30] Foreign Application Priority Data

Jan. 29, 1990 [JP] Japan ................................ 2-18717

[51] Int. Cl.⁵ .............................................. B62M 7/12
[52] U.S. Cl. ..................................... 180/220; 180/223; 180/65.5; 296/901
[58] Field of Search ............. 180/219, 220, 223, 65.5, 180/65.6, 205–208; 296/901, 196

[56] References Cited

U.S. PATENT DOCUMENTS

| D. 175,975 | 11/1955 | Piatti | 180/219 |
|---|---|---|---|
| 2,225,914 | 12/1940 | Lewis et al. | 180/219 |
| 3,220,748 | 11/1965 | Moulton | 180/219 |
| 3,773,131 | 11/1973 | Jaulmes | 180/220 |
| 3,881,566 | 5/1975 | Moore | 180/219 |
| 3,934,669 | 1/1976 | Adams | 180/220 |
| 4,346,777 | 8/1982 | Restelli | 180/65.5 |
| 4,458,909 | 7/1984 | Morioka | 180/219 |

FOREIGN PATENT DOCUMENTS

| 3632781 | 3/1988 | Fed. Rep. of Germany | 180/65.5 |
|---|---|---|---|
| 0177865 | 4/1922 | United Kingdom | 180/219 |
| 2183105 | 5/1987 | United Kingdom | 180/65.5 |

Primary Examiner—Margaret A. Focarino
Assistant Examiner—Anne Marie Boehler
Attorney, Agent, or Firm—Dellett, Smith-Hall and Bedell

[57] ABSTRACT

An electromotive scooter body is a hollow construction made of fiber reinforced plastics, so that the body is strong and light to reduce load on a traveling motive power source. The body can be separated into upper and bottom parts and the hollow of the bottom part accepts many batteries, so that a center of gravity of the scooter can be low.

6 Claims, 4 Drawing Sheets

SCOOTER BODY AND FRONT-WHEEL DRIVE TYPE ELECTROMOTIVE SCOOTER

BACKGROUND OF THE INVENTION

The present invention relates to a scooter body consisting of a hollow construction made of fiber reinforced plastics and to a two- or three-wheeled type electromotive scooter whose front wheel is driven by a direct drive motor.

A prior art scooter body is made of processed steel or cast steel, and a battery case is additionally provided in general.

In a prior art, a direct drive type electromotive wheel is well known in which a stator and a rotor of a direct drive motor as a driving motive source are directly provided between a shaft of the wheel and a disk portion. Such a direct drive type electromotive wheel is shown in FIGS. 4 and 5 wherein FIG. 5 is a cross sectional view along lines V—V in FIG. 4. A boss opening 33a of an armature core 33 is coupled with a wheel shaft 32, so that the armature core 33 is fixed to the wheel shaft 32 by bolts 34. Motor side plates 36 and 37 are rotatably supported at both sides of the armature core 33 by the wheel shaft 32 through bearings 35. Permanent magnets 38 are fixed between the motor side plates 36 and 37, and a wheel rim 39 is fixed to the outside edges of the motor side plates 37. A wheel 1 provided on the outside surface of the tire rim 39, and the wheel shaft 32 is coupled with the scooter body via suspension rods 7.

An electromotive scooter and an electromotive vehicle of two, three or four wheels have been researched and designed or partially implemented wherein such a direct drive type electromotive wheel is used as a driving wheel.

A conventional scooter body is very heavy, because the body is made of processed steel or cast steel. Thus, load on traveling motive power source is very large. In an electromotive scooter, a battery case should be additionally provided as a separable construction to the body so that the battery case receives many batteries. Therefore, it is expensive in process and manufacturing.

All conventional electromotive scooters are a rear-wheel drive type in which a rear wheel is driven, and a front-wheel drive type has been not proposed yet. In the rear-wheel drive type electromotive scooter, especially in a three-wheeled scooter having two rear wheels, two electromotive wheels are needed. Thus, it is expensive and complex in a control device. Moreover, electric wiring is complex and troublesome. If such a scooter is improved to be comfortable to drive by using independent suspension type two rear wheels, the independent suspension mechanism is further complex and troublesome. These disadvantages should be resolved.

It is therefore an object of the present invention to provide a scooter body and a front-wheel drive type electromotive scooter which resolves the aforementioned disadvantages of the prior art.

SUMMARY OF THE INVENTION

In order to resolve the above discussed disadvantages of the prior art, a scooter body of this invention is a hollow construction made of fiber reinforced plastics.

Moreover, a body of an electromotive scooter according to this invention is a fiber reinforced plastics construction having a hollow, and the lower portion of the body is constructed such that this lower portion can be separated into an upper sub-portion and a lower sub-portion. A hollow of the lower sub-portion receives many batteries.

As being described hereinbefore, the body can be separated into the upper and lower portions or an upper part and a bottom part. Foot step plates are provided substantially horizontal along separation edges of both sides of the upper and bottom parts. The upper and bottom step plates are removably coupled with each other by bolts and nuts of superposition.

Since the hollow construction body is very light, load on traveling motive power source is reduced.

Because of the hollow construction body, the hollow of the lower portion can be effectively used as the battery case and many batteries can be effectively mounted in the case. In addition, a centroid of the scooter becomes low and the scooter can travel in stable because of the weight of the batteries set on the lower portion of the body.

The batteries mounted on the lower portion of the body can be exchanged by using the bottom part of the body as the battery case or battery tray wherein the bottom part can be moved toward ground by separating it from the upper portion.

Moreover, in order to resolve the above discussed disadvantages of the prior art, a front-wheel drive type electromotive scooter of this invention is characterized as follows.

The front wheel is a direct drive type electromotive wheel in which a stator and a rotor of a direct drive motor as a traveling motive power source are directly provided between a wheel shaft and a disk part of the front wheel. Batteries and a control device thereof are set on the body.

A body of the electromotive scooter is a hollow construction made of fiber reinforced plastics. The control device is set in the hollow adjacent to a frame neck which extends from a steering shaft of the front portion of the body to a step portion. The batteries and the front wheel are electrically connected to each other via the control device. A power cable is connected to the front wheel through an opening adjacent to the steering shaft and through an extension portion of the steering shaft.

This electromotive scooter travels by using the front wheel as the drive wheel of producing thrust.

Since the power cable is wired through the opening near the steering shaft and the extension portion of the steering portion into the front wheel, the cable does not affect the steering control.

The present invention is pointed out with particularity in the appended claims. Other objects and advantages of the present invention will become apparent to those having ordinary skill in the art when taken in conjunction with the accompanying drawings.

DRAWINGS

DETAILED DESCRIPTION OF THE INVENTION

A preferred embodiment of the present invention will be discussed by reference to the attached drawings.

Figure 1:
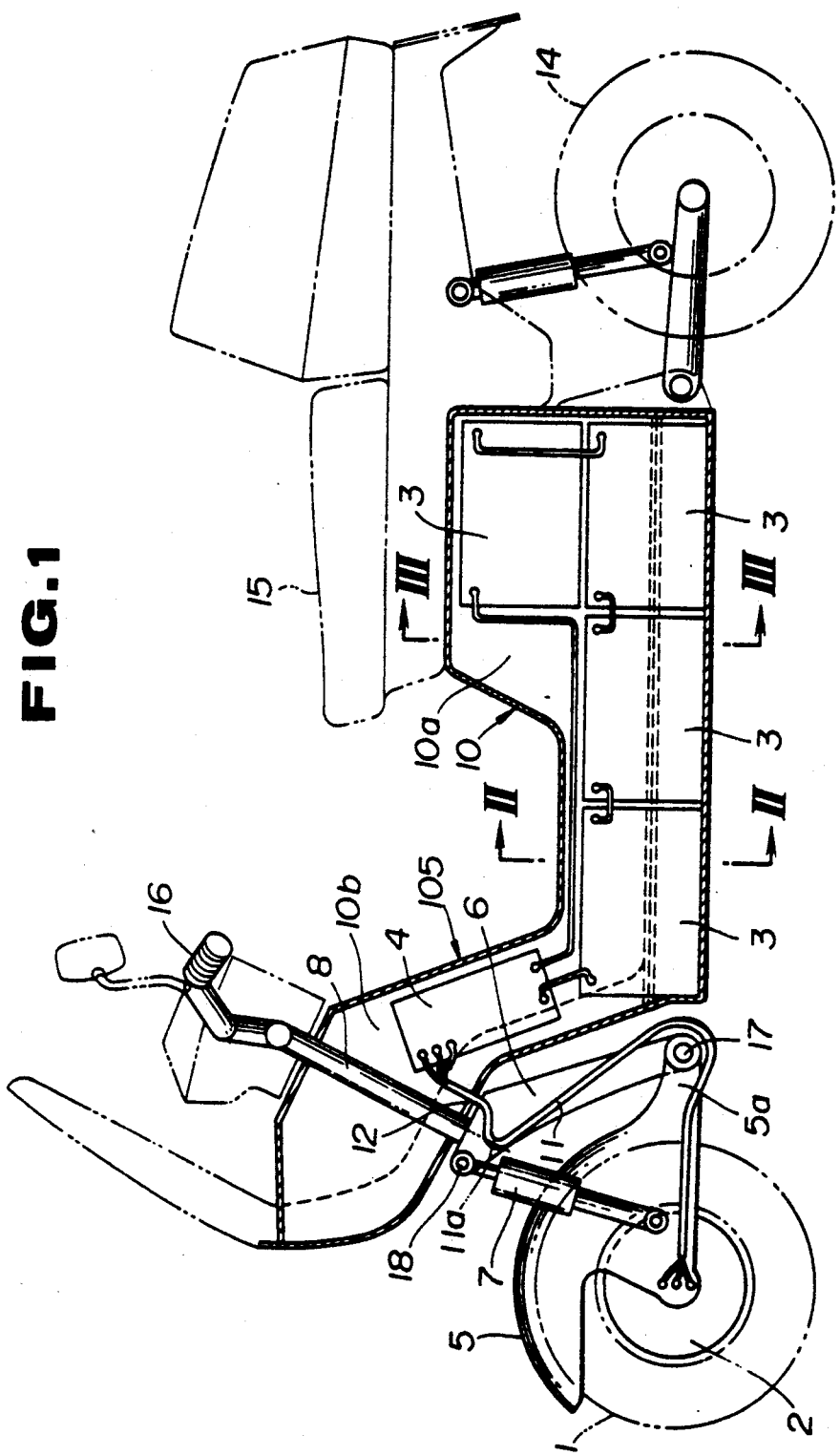
FIG. 1 is a front view of a front-wheel drive type electromotive motor according to this invention in which a main portion is cut.
Figure 4:
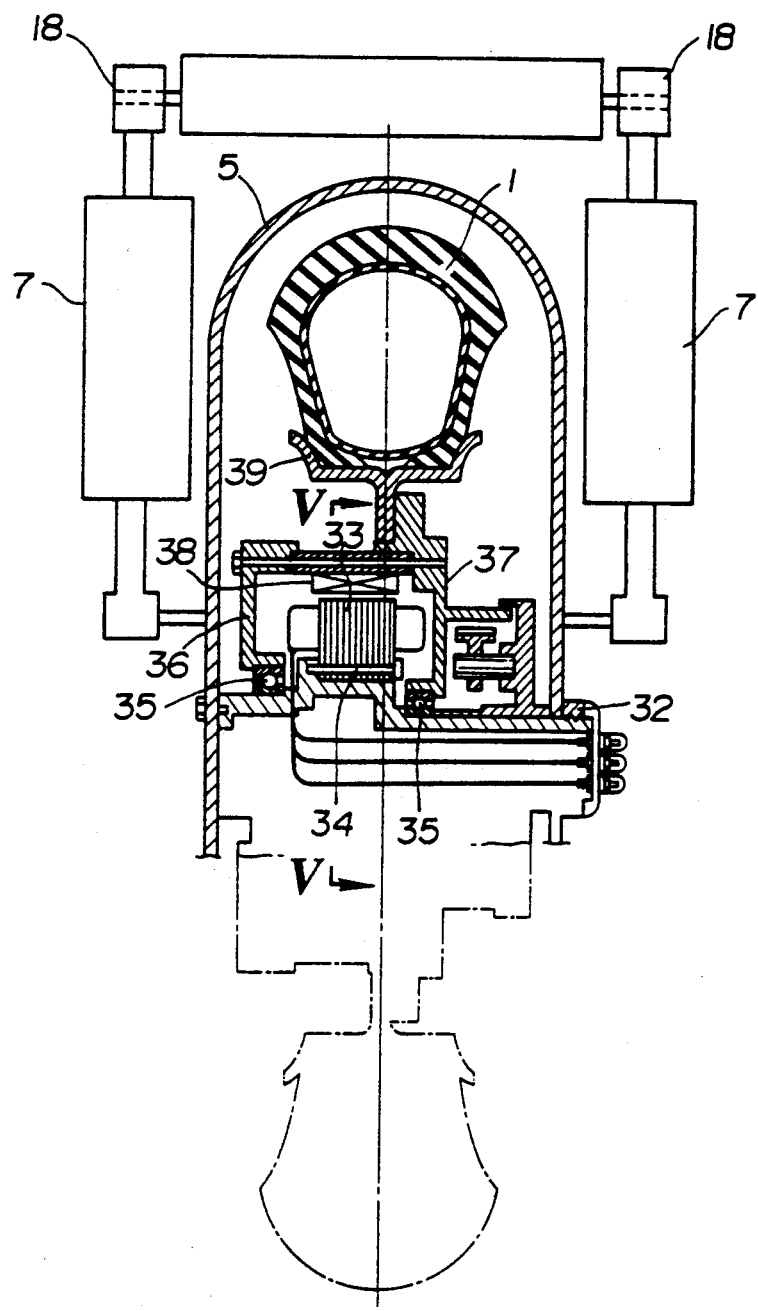
FIG. 4 is a cross sectional view of a conventional electromotive wheel.
Figure 5:
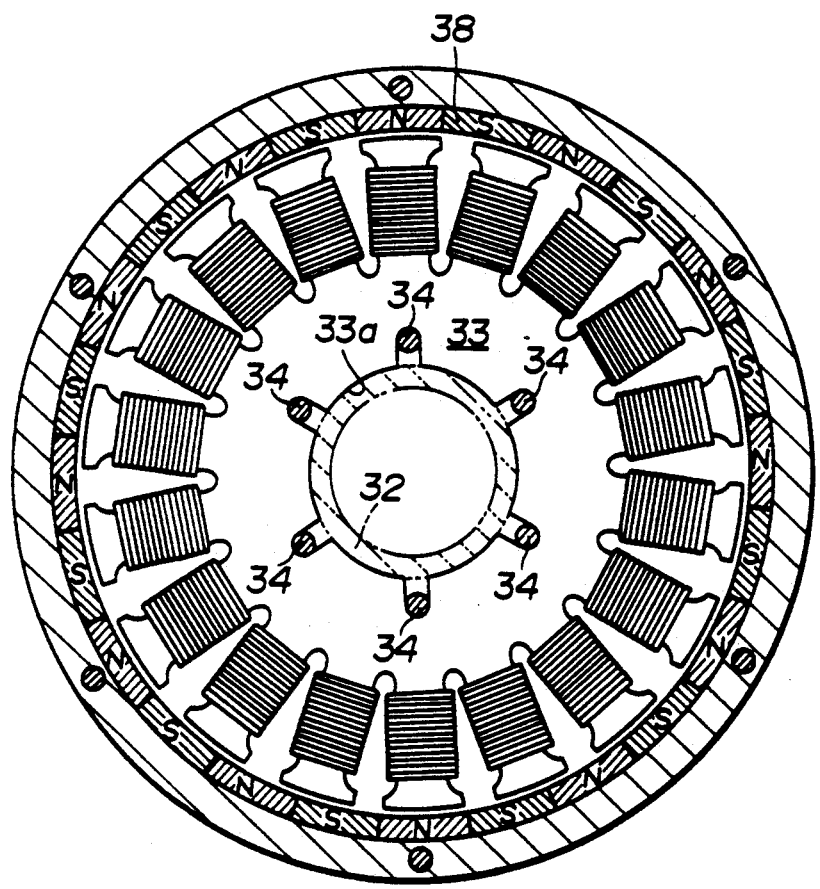
FIG. 5 is a cross sectional view along lines V—V of FIG. 4.

The electromotive scooter shown in FIG. 1 is a front-wheel drive type in which a front wheel 1 is a drive wheel (electromotive wheel) and a rear wheel 14 is a dependent wheel (free wheel). The front wheel 1 is a well known electromotive wheel as a direct drive type wherein a stator and a rotor of a direct drive motor 2 as a traveling motive power source are directly provided between a wheel shaft and a disk portion of the front wheel 1. This well know electromotive wheel has been discussed hereinbefore by reference to FIGS. 4 and 5. Both ends of the wheel shaft are supported by a front fender 5.

The front fender 5 is large and strong such that it can act as a suspension arm for the front wheel 1. An arm portion 5a extended from the lower portion of the front fender 5 to the rear portion thereof is coupled with a lower portion of a link arm 6 by a pin 17. An upper portion of the link arm 6 is coupled with an upper portion of a suspension rod 7 by a pin 18, and a lower portion of the suspension rod 7 is coupled with a part of the front fender 5 adjacent to a wheel shaft by a pin. Thus, a triangle shaped suspension mechanism is constructed as shown in FIG. 1. The upper portion of the link arm 6 is coupled with a lower portion of a steering shaft 8. A reference number 16 represents a steering controller.

The body 10 of the electromotive scooter is a hollow construction which is strong and made of fiber reinforced plastics (FRP). Thus, the body 10 is very light in weight. However, such a hollow construction type scooter body can be applied to the front-wheel type electromotive scooter as well as a rear-wheel type electromotive scooter or an internal combustion engine type scooter.

Figure 2:
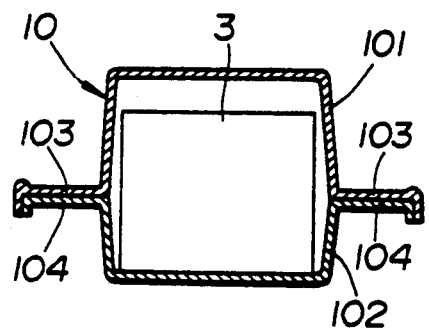
FIG. 2 is a cross sectional view along lines II—II of FIG. 1.
Figure 3:
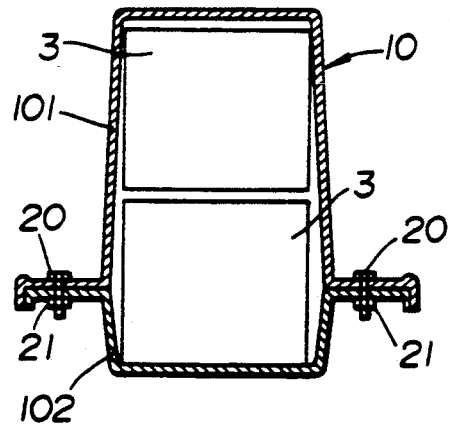
FIG. 3 is a cross sectional view along lines III—III of FIG. 1.

A lower portion of the body 10 is constructed such that it can be separated into an upper portion and a lower portion as shown in FIGS. 2 and 3. A bottom part 102 can be removed from an upper part 101 which constructs a large part of the body 10, and the separation surfaces are substantially horizontal. The bottom part 102 can be used as a battery case or a battery tray. Foot plates 103 and 104 are extended horizontally from both the sides of the upper part 101 and the bottom part 102. These upper and lower step plates 103 and 104 are overlapped with each other and are assembled as one body by bolts 20 and nuts 21. Many batteries 3 are mounted in a lower hollow portion 10a of the body 10 by providing the batteries 3 on the bottom part 102. When the bolts 20 and the nuts 21 are removed, the bottom part 102 and the batteries 3 can be lowered vertically onto ground in order to exchange the batteries or charge them. After charging the batteries, the bottom part 102 and the batteries 3 are lifted up vertically, and the bottom part 102 and the upper part 101 are coupled with each other again by the bolts and nuts to secure the batteries. Of course, additional charged batteries 3 may be previously set on the bottom part 102 as the battery tray and may be exchanged.

A control device 4 for controlling the direct drive motor 2 of the front wheel 1 is mounted in a hollow portion 10b near a frame neck 105 which extends from a steering shaft portion at the front of the body 10 to the step plates 103 and 104 at the lower center. The steering shaft 8 extends through the steering shaft portion. The power batteries 3 and the direct drive motor 2 of the front wheel 1 are connected to each other through the control device 4 by a power cable 11. In addition, the control device 4 and the direct drive motor 2 are connected to each other by a control wire positioned along the power cable 11 in order to control the speed and braking. The power cable 11 or the like is wired from the body 10 to the front wheel 1 through an opening 12 of the body 10 near the steering shaft 8 and an extension part 11a of the steering shaft 8. Thus, the steering control does not pull or damage the cables. The length of the power cable 11 or the like should be as short as possible. In the front wheel 1, the power cable 11 or the like takes a long way around the outside of the pin 17 along the link arm 6 and extends substantially horizontally along the bottom side of the front fender 5. Then, the power cable 11 or the like is connected to the wheel shaft portion of the direct drive motor 2. A reference number 15 represents a driver seat.

As being described hereinbefore, the scooter body of this invention is the hollow construction made of FRP, so that it is very light and can reduce a load on traveling motive power. Moreover, there is a space to receive the batteries 3 in the hollow portion 10a of the lower portion of the hollow constructed body 10, so that an additional battery case is not needed and the body is inexpensive and is light in weight. Thus, this is useful for the electromotive scooter. Since the batteries are mounted at the lower portion of the body, the electromotive scooter of this invention can run stably because of the low center of gravity. The lower portion of the body 10 can be separated into the upper and lower parts and the battery can be mounted, so that it is easy to exchange the batteries rapidly. Thus, it is convenient to handle.

In addition, according to the front-wheel drive type electromotive scooter of the present invention, the front wheel 1 can be used as the electromotive wheel (drive wheel) to produce traveling thrust, so that it is inexpensive to manufacture the three-wheeled scooter having two rear wheels. Moreover, it is easy in traveling control, and electric power consumption can be saved so that the distance covered can be long for one charge.

The two rear wheels can be of the independent suspension type, which is easy and inexpensive to manufacture and this is a comfortable scooter to ride.

While I have shown and described herein the preferred embodiment of the present invention, it will be apparent to those skilled in the art that many changes and modifications may be made without departing from the present invention in its broader aspect.

I claim:
1. An electromotive scooter comprising:
a front wheel,
rear wheel means for engaging the ground and comprising at least one rear wheel,
an electric motor coupled drivingly to at least one wheel,
a scooter body made of fiber reinforced synthetic plastic and composed of an upper part that is connected to the front wheel and the rear wheel means for supporting the scooter body and a lower part that is releasably connected to the upper part at a substantially horizontal parting line, said upper part having a horizontal portion extending between the front wheel and the rear wheel means, a frame neck that extends upwardly from a forward region of said horizontal portion, and an upsurge portion toward the rear of said horizontal portion, at least the horizontal portion of the scooter body defining a cavity, and wherein the upper part of the scooter body includes horizontal footrest plates that extend from the scooter body at the parting line, the lower part of the scooter body includes horizontal plates that extend immediately beneath the horizontal footrest plates and in contact therewith, and the lower part of the body is attached to the upper part of the body by fastening elements that extend through the horizontal footrest plates and the horizontal plates of the lower part of the body, and a plurality of batteries contained in the cavity and resting on said lower part of the scooter body.

2. A scooter according to claim 1, wherein the motor is a direct drive motor.

3. An electromotive scooter comprising:

a front wheel, rear wheel means for engaging the ground and comprising at least one rear wheel, a direct drive electric motor incorporated in the front wheel, a scooter body made of fiber reinforced synthetic plastic and composed of an upper part that is connected to the front wheel and the rear wheel means for supporting the scooter body and a lower part that is releasably connected to the upper part at a substantially horizontal parting line, said upper part having a horizontal portion extending between the front wheel and the rear wheel means, a frame neck that extends upwardly from the forward region of said horizontal portion, and an upsurge portion toward the rear of said horizontal portion, and at least the horizontal portion of the scooter body defining a cavity, a plurality of batteries contained in the cavity and resting on said lower part of the scooter body, a control device mounted in the frame neck, a steering shaft that extends through the frame neck to the front wheel, and a power cable connecting the control device to the motor, the power cable extending through an opening in the frame neck near the steering shaft.

4. A scooter according to claim 3, wherein at least one of the upper part and the lower part of the scooter body comprises horizontal footrest plates that project from the scooter body.

5. A scooter according to claim 3, wherein the upper part of the scooter body includes horizontal footrest plates that extend from the scooter body at the parting line, the lower part of the scooter body includes horizontal plates that extend immediately beneath the horizontal footrest plates and in contact therewith, and the lower part of the body is attached to the upper part of the body by fastening elements that extend through the horizontal footrest plates and the horizontal plates of the lower part of the body.

6. A scooter according to claim 3, wherein the front wheel comprises a shaft, an annular disk portion, and bearings supporting the annular disk portion for rotation relative to the shaft, and the motor comprises a stator attached to the shaft of the front wheel and a rotor attached to the annular disk portion of the front wheel.

* * * * *